Oct. 12, 1954

A. H. MILLS 2,691,229

LAND LEVELING AND FINISHING MACHINE

Filed June 11, 1952

INVENTOR
*Alfred H. Mills*
BY *John H. Randolph*
ATTORNEY

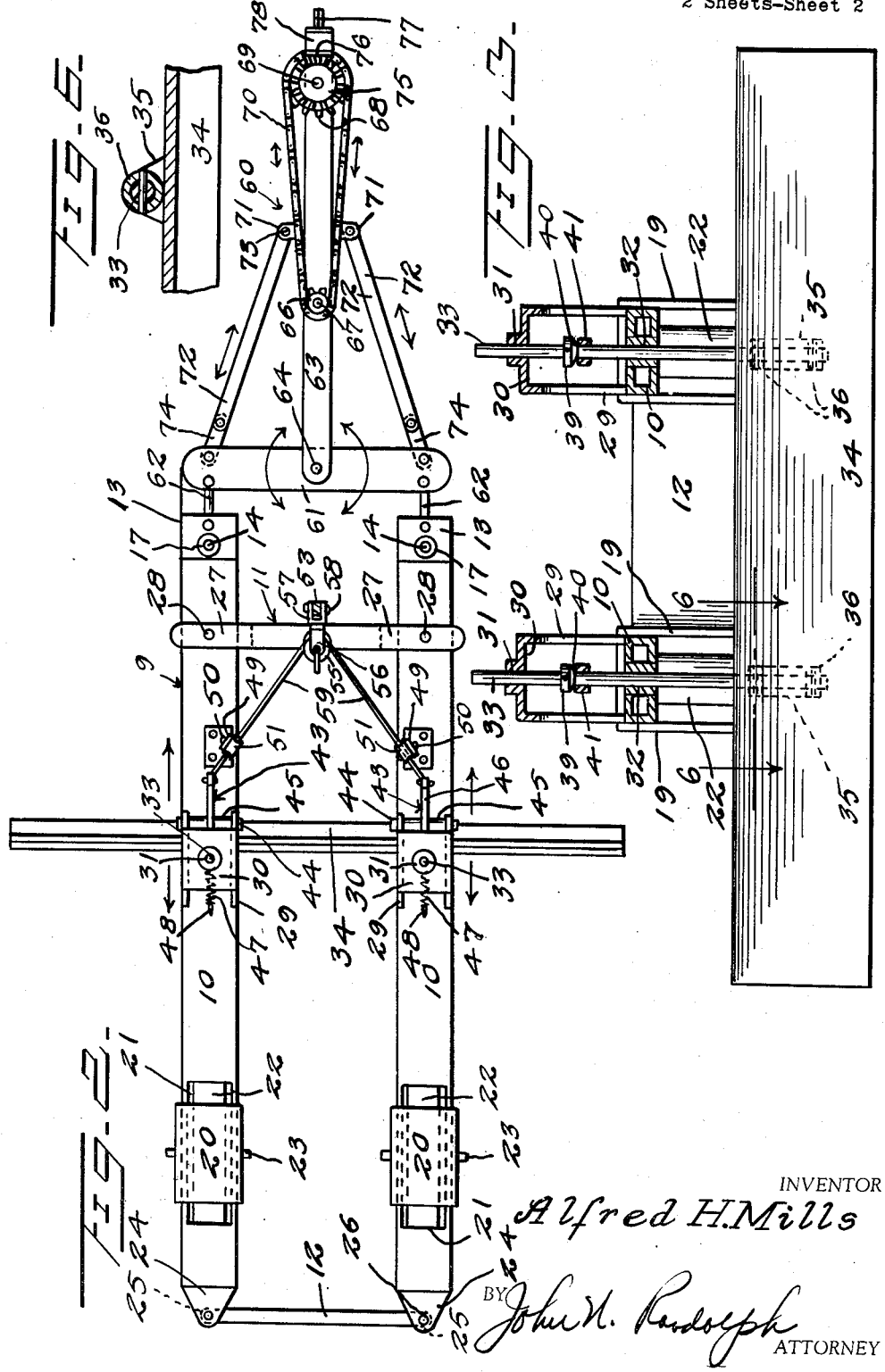

Patented Oct. 12, 1954

2,691,229

UNITED STATES PATENT OFFICE 2,691,229

LAND LEVELING AND FINISHING MACHINE

Alfred H. Mills, Kent, Tex.

Application June 11, 1952, Serial No. 292,960

5 Claims. (Cl. 37—155)

This invention relates to a machine for use as a farm and road implement to level and drift earth, to fill in around borders, to cross check land, to fill ditches and gullies, and to smooth, finish and maintain roads.

More particularly, it is an aim of the present invention to provide a machine of relatively light weight capable of being operated from the seat of a draft vehicle, such as a tractor, by the draft vehicle operator, for both raising and lowering a scraping and leveling blade and for turning the blade to position either end thereof in advance of the other end for drifting earth laterally away from either side of the machine, both of which blade adjustments may be accomplished by the tractor operator without leaving his seat on the tractor and while the leveling machine is in motion.

Still a further object of the invention is to provide a machine of the aforedescribed character of extremely simple construction which may be very economically manufactured and sold, which is relatively light in weight requiring a relatively light draft under normal conditions and which is so constructed that it may readily function in conjunction with conventional parts of a tractor for actuating the mechanism of the machine for raising and lowering and angularly adjusting the scraper blade.

Still another object of the invention is to provide a machine capable of functioning with various makes of tractors with equal efficiency.

Numerous other objects and advantages of the invention will hereinafter become more fully apparent from the following description of the drawings, illustrating a presently preferred embodiment thereof, and wherein:

Figure 1 is a side elevational view, partly in section, showing the machine in an operative position;

Figure 2 is a top plan view thereof, partly in horizontal section, taken substantially along a plane as indicated by the line 2—2 of Figure 1;

Figure 3 is an enlarged cross sectional view taken substantially along a plane as indicated by the line 3—3 of Figure 1;

Figure 4 is an enlarged fragmentary cross sectional view taken substantially along a plane as indicated by the line 4—4 of Figure 1;

Figure 5 is an enlarged horizontal sectional view of a portion of the machine, taken substantially along a plane as indicated by the line 5—5 of Figure 1, and Figure 6 is a horizontal sectional view taken substantially along a plane as indicated by the line 6—6 of Figure 3.

Referring more specifically to the drawings, the land leveling or drifting machine in its entirety is designated generally 8 and comprises a frame, designated generally 9, formed of corresponding longitudinal side beams 10, a front cross brace 11 and a rear cross brace 12. The longitudinal beams 10 are preferably of hollow construction being formed of a rigid relatively light weight metal. Said beams 10 are provided with downwardly offset forward ends 13 in each of which is journalled the upwardly extending kingbolt or spindle 14 of a caster wheel fork 15 which is disposed therebeneath and in which a caster wheel 16 is journalled. Suitable collars 17 are detachably fixed to the spindle 14 for rotatably and nonslidably securing it to its forward beam end 13. The forward ends of the beams 10 are thus supported by the casters 15, 16 which constitute the wheel support for the forward end of the machine 8.

Each of the beams 10 is provided with a depending frame 18 at its rear end having a pair of braces 19 extending upwardly and forwardly from the lower end of the frame 18 and which are secured to and merge with the beam 10 at their forward ends. An arched shaped wheel guard or shield 20 is disposed over the portion of each beam 10 and is secured at its ends to the braces 19 thereof. The wheel guards 20 are disposed over openings 21 in the beams 10 each of which is adapted to accommodate the upper portion of a rear ground engaging wheel 22. Each beam 10 is equipped with a wheel 22 which is disposed between its braces 19, between the sides of its wheel guard 20 and beneath the upper portion of said wheel guard, as best seen in Figures 1 and 4. Each wheel 22 is journalled on an axle 23, the end portions of which extend outwardly through and are mounted in the braces 19 and the side portions of the wheel guard 20 which straddle said wheel. The rear end of the machine 8 is thus supported by the rear wheels 22 which, in combination with the caster wheels 16, constitute the supporting wheels of the machine.

The depending frame portions 18 at the rear ends of the beams 10 are each provided at the upper and lower ends thereof with a rearwardly projecting apertured ear 24. The apertures of the ears 24 of each frame or hanger 18 are disposed in alignment and are adapted to align with a transverse sleeve 25 forming an end of the rear cross brace 12 and which is loosely disposed between said ears. A headed pivot pin 26 extends through each pair of ears and loosely through the sleeve 25 disposed therebetween. The rear cross brace 12 is thus swingably connected to the rear ends of the beams 10 for swinging movement relatively to each beam about a vertical axis. The front cross brace 11 is disposed near to but spaced from the downwardly offset forward beam ends 13 and is provided with bifurcated ends 27 each including a top furcation and a bottom furcation. The furcations of the bifurcated ends 27 straddle the beams 10 and are pivotally connected thereto by pivot pins 28 which extend downwardly through said furcations and through the beams to form vertical axes about which the end portions of the cross brace 11 is swingable relatively to said beams. Accordingly, it will be readily apparent that either beam 10 may be displaced forwardly or rearwardly relatively to the other beam while maintaining said beam in substantially parallel relationship and while the cross braces 11 and 12 are thus maintained in substantially parallel relationship either transversely of the beams, when the ends of the longitudinal beams are in transverse alignment or at various angles to the beams 10 when one of said beams is disposed forwardly of the other beam.

Each of the beams 10 is provided intermediate of its ends with an upstanding frame 29 which is suitably fixed thereto. Each frame 29 has a substantially horizontal top wall or plate 30 provided with a centrally disposed flanged opening 31, as best seen in Figure 3, which is disposed above and in vertical alignment with an opening 32 in the beam 10 above which said plate is mounted. A hanger rod 33 extends slidably through the aligned openings 31 and 32, the lower ends of said hanger rods depending from the underside of the intermediate portions of the beams 10 between the rear wheels 22 and the front cross brace 11. A relatively long scraping and leveling blade 34 is disposed beneath the frame 9 and extends outwardly from either side thereof, as illustrated in Figure 2. The convex, rear side of the blade 34 has a pair of longitudinally spaced sleeves 35 fixed thereto. The sleeves 35 are disposed vertically beneath and in alignment with the beam openings 32 and are adapted to turnably receive therein the lower ends of the hanger rods 33 which are non-slidably connected thereto each by a pair of collars 36. The collars 36 are fixed to the rods 33 above and beneath the sleeves 35. A brace or thrust absorbing link or rod 37 is disposed beneath each beam 10 and is pivotally connected at its forward end to the pivot pin 28, which extends through said beam. Each brace rod 37 has an eye or collar 38 at its rear end which loosely engages around the rod 33 beneath the beam 10 and substantially above the blade 34. The rods 37 absorb the rearward thrust on the lower portions of the hanger rods 33 below the beams 10 when the blade 34 is in a ground engaging position at or beneath its position of Figure 1.

As best seen in Figures 1, 3 and 5 a collar 39 is secured to each rod 33 between the openings 31 and 32 engaged thereby. Said collars 39 are preferably provided with convexly rounded undersides 40 adapted to slidably and turnably engage the bifurcated ends 41 of lever arms 42, which bifurcated ends straddle the hanger rods 33. The lever arms 42 constitute complementary ends of bell cranks 43 which are pivotally mounted at their apexes, one on each of the frames 29. As best seen in Figure 5, the front portion of each frame 29 has a pivot pin or bolt 44 extending transversely thereacross and through the apex of one of the bell cranks 43 for mounting the bell crank for rocking movement in a vertical plane about the horizontal axis 44. Each bolt 44 supports spacing sleeves 45 disposed thereon between the front frame portions 29 and the bell crank 43 and which maintains the bell crank in longitudinal alignment with the hanger rod 33 which it engages. The lever arms 42 extend rearwardly from the lever pivots 44. The other, longer arms 46 of the bell cranks 43 extend upwardly and forwardly from the frames 29 at obtuse angles to the lever arms 42. A pull spring 47 is secured to each collar 39 and extends downwardly and rearwardly therefrom between the lever furcations which engage said collar. The opposite ends of the pull springs 47 are anchored by fastenings 48 to the beams 10. Accordingly, the springs 47 urge the hanger rods 33 downwardly for displacing the scraping blade 34 downwardly into an earth engaging operative position and additionally tend to swing the bell cranks 43 counterclockwise as seen in Figure 1 about their pivots 44.

A bearing standard 49 is secured to and rises from each beam 10 forwardly of and adjacent its frame 29 and is disposed at an oblique angle to the longitudinal axis of said beam and near its inner edge. An axle 50 is secured to the standard 49 and extends inwardly and rearwardly therefrom to provide a journal for a sheave 51. An ear 52 projects forwardly from the intermediate portion of the front cross brace 11 to provide a support for the lower end of a lever 53 which is pivotally connected thereto by a pivot pin 54 to mount said lever for swinging movement in a vertical plane about the horizontal axis 54. A sheave 55 is mounted in a pulley block 56 which has a bifurcated shank 57 straddling the intermediate portion of the lever 53 and is swingably connected thereto by a pivot pin 58. The pulley block 56 extends rearwardly from the lever 53 and is mounted for vertical swinging movement longitudinally of said lever. The lever 53 is connected to the terminals of the lever arms 46 by a flexible member 59 the intermediate portion of which is trained around the sheave 55 and the end portions of whch extend from said sheave downwardly and outwardly under the sheaves 51 and thence upwardly to the terminals of the levers 46 to which the ends of the flexible member 59 are secured. Accordingly, when the lever 53 is swung forwardly an equal pull will be exerted by the flexible member 59 on the lever arms 46 to cause said arms to swing downwardly and so that the other bell crank arms 42 will be swung upwardly to exert an upward thrust on the collars 39 and hanger rods 33 for elevating the blade 34. It will be obvious that the bell cranks 43 will be rocked through corresponding arcs by forward movement of the lever 53 even though one of the beams 10 is disposed forwardly of the other beam since the flexible member 59 is displaceable through the sheave block 56 to equalize the tension on the two lever arms 46.

A draft connection 60 is attached to and extends forwardly from the forward end of the frame 9 and includes a crossbar 61 which is disposed forwardly of the beam ends 13. The crossbar 61 is loosely connected adjacent its ends to the beam ends 13 by links 62 which are swingably connected thereto and to said beam ends for mounting the crossbar 61 for free swinging movement in advance of the beam ends 13. A draft tongue 63 is pivotally connected at its rear end by a pivot pin 64 to the intermediate portion of the crossbar 61 and extends forwardly therefrom and is disposed for horizontal swinging movement relatively to said crossbar. The forward end of the draft tongue 63 is adapted to be coupled to a draft vehicle, as for example the drawbar of a tractor, not shown, by means of a coupling pin 65. A small sprocket wheel 66 is disposed above the tongue 63 near its rear end and is journalled on a shaft 67 which rises from the tongue. A larger sprocket wheel 68 is disposed above the tongue 63, adjacent its forward end, and is similarly journalled on a shaft 69 which is fixed to and extends upwardly from the tongue. An endless chain 70 is trained around the sprocket wheels 66 and 68. One link of each flight of the chain 70 is provided with an outwardly projecting apertured lug 71, which lugs are spaced from the sprocket wheels 66 and 68 when the beams 10 are in their normal positions with the forward beam ends 13 in transverse alignment. The complementary ends of two side or pull tongues 72 are pivotally connected by pivot pins 73 to the chain lugs 71. The pull tongues 72 extend rearwardly from the lugs 71 in diverging relationship to one another and are swingably connected adjacent their rear ends by links 74 to the end portions of the crossbar 61.

A beveled gear 75 of smaller diameter than the sprocket wheel 68, is fixed to the upper side thereof and meshes with a beveled pinion 76 which is fixed to the rear end of a shaft 77 which extends forwardly therefrom. The shaft 77 is journalled adjacent the beveled gear 76 in a bearing standard 78 which is fixed to and rises from the forward end of the tongue 63, forwardly of the sprocket wheel 68. The shaft 77 is adapted to be coupled in any suitable manner, as by means of a universal joint, not shown, to the power take-off shaft, not shown, of the tractor forming the draft vehicle for the machine 8 and to which said machine is connected by the coupling pin 65. A flexible member 79 is secured to the upper end of the lever 53 and extends forwardly therefrom and is adapted to be connected at its forward end, not shown, to the tractor power lift or hoist.

Assuming that the machine 8 is coupled as a trailer vehicle to a tractor or similar draft vehicle not shown, that the shaft 77 thereof is connected to a tractor power take-off shaft and the flexible member 79 is connected to a tractor hoist or power lift, in order to lower the blade 34 below its position of Figure 1, the tractor power lift or hoist may be operated to swing in one direction for slacking off the flexible member 79 so that the bell crank ends 42 may swing downwardly under the weight of the blade 34 and the downward biasing pull of the springs 47 to thus displace the blade downwardly into a deeper earth engaging position. Converserly, the power lift or hoist may be operated to swing in the opposite direction to exert a forward pull on the flexible member 79 to swing the lever 53 forwardly so that the flexible member 59 will exert a downward pull on the bell crank arms 46 to swing the bell crank arms 42 upwardly for elevating the hanger rods 33 and the blade 34 to a more shallow operating position or to an elevated inoperative position out of engagement with the earth, as for the purpose of transporting the machine 8 when not in use. The blade 34 is illustrated in Figure 2 as being disposed directly crosswise of the longitudinal axis of the machine 8. If it is desired to drift the earth toward the left side of the machine, looking from rear to front or left to right thereof as seen in Figure 2, the power take-off shaft of the tractor is actuated for turning the shaft 77 and pinion 76 in a direction to turn the sprocket wheel 68 counterclockwise as seen in Figure 2 so that the right-hand chain flight will move forwardly and the left-hand chain flight rearwardly, to cause the crossbar 61 to swing counterclockwise on its pivotal connection 64 to the draft tongue 63 to advance the right-hand beam 10 and to displace the left-hand beam 10 rearwardly, so that the blade 34 will then be inclined rearwardly from its right-hand to its left-hand end, as viewed from the rear end of the machine, so that the earth scraped by the blade will be drifted and deflected off of the trailing left-hand end of the blade. Similarly, the power take-off shaft may be driven in the opposite direction to turn the sprocket wheel 68 clockwise as seen in Figure 2 to reverse the procedure previously described so that the blade will be inclined in the opposite direction for drifting or deflecting the earth or dirt off of the trailing right-hand end of the blade.

It will thus be readily apparent that a machine of extremely simple construction has been provided capable of attachment to a conventional tractor to be pulled thereby and which is additionally so constructed that actuation of the scraping blade may be accomplished by conventional tractor parts for raising or lowering the blade or for positioning the blade at various desired angles relatively to the direction of travel of the machine, all of which functions and results may be accomplished by the novel structure of the machine and without any modification being required in connection with any of the structure of a conventional tractor having a power driven hoist and a power take-off shaft.

Various modifications and changes are contemplated and may obviously be resorted to, without departing from the spirit or scope of the invention as hereinafter defined by the appended claims.

I claim as my invention:

1. A machine of the character described comprising a pair of laterally spaced longitudinally extending beams, surface engaging wheels disposed beneath and supporting said beams adjacent the ends thereof, cross braces connecting said beams adjacent the ends thereof and swingably connected to the beams, hanger means extending downwardly from said beams, a scraping and leveling blade swively connected to and supported by said hanger means beneath the beams, means for displacing one of the beams forwardly with respect to the other beam for swinging the blade for positioning one end thereof in advance of the other blade end, said last mentioned means including a crossbar disposed transversely of and swingably connected to forward ends of the beams, a draft tongue extending forwardly from and swingably connected to the intermediate portion of said crossbar, side tongues pivotally connected to and extending forwardly from the crossbar adjacent its ends, actuating means connected to the forward ends of the side tongues for displacing one of the side tongues forwardly and the other side tongue rearwardly for displacing said beams longitudinally in opposite directions, said actuating means comprising an endless chain having opposite flights to which forward ends of the side tongues are connected, sprocket wheels journalled in longitudinally spaced relationship on said draft tongue and around which said chain is trained, and means for driving one of said sprocket wheels in either direction.

2. A machine as in claim 1, said sprocket wheel driving means comprising a beveled gear fixed to one of the sprocket wheels, a beveled pinion meshing with said beveled gear, and a power take-off shaft extension fixed to the beveled pinion and extending forwardly from the draft tongue.

3. A machine as in claim 1, said hanger means comprising rods, frames fixed to and rising from the beams having upper portions through which the rods slidably extend, collars fixed to said rods between the upper frame portions and said beams, bell cranks swingably connected to said frame portions each having an end engaging under one of said collars and an opposite end normally extending upwardly from the frame portions, and means connected to the upwardly extending last mentioned bell crank ends for simultaneously exerting a downward pull thereon for elevating the hanger rods and blade.

4. A machine as in claim 3, said last mentioned means comprising a lever pivotally connected to and extending upwardly from one of said cross braces and disposed forwardly of the bell cranks, said lever being pivotally mounted for forward and rearward swinging movement, a pulley block connected to said lever intermediate of its ends, and a flexible member having an intermediate portion trained through the pulley block and having end portions connected to the upwardly extending end of the bell cranks for exerting a downward pull on said upwardly extending bell crank ends when the lever is swung forwardly of the machine.

5. A machine as in claim 4, and a tractor hoist actuated flexible member having one end connected to the upper end of said lever and extending forwardly therefrom and adapted to be displaced forwardly for exerting a forward pull on said lever.

References Cited in the file of this patent

UNITED STATES PATENTS

| Number | Name | Date |
|---|---|---|
| 1,249,187 | Pile | Dec. 4, 1917 |
| 1,277,623 | Matthews | Sept. 3, 1918 |
| 1,327,047 | Kimbley | Jan. 6, 1920 |
| 1,876,604 | Bruner et al. | Sept. 13, 1932 |